June 30, 1970 T. C. ABRAHAMSEN 3,517,792

MULTIPLE FONT KEYBOARD

Filed Dec. 19, 1967 3 Sheets-Sheet 1

Inventor:
THOMAS C. ABRAHAMSEN

By H. Christoffersen
Attorney

June 30, 1970 T. C. ABRAHAMSEN 3,517,792

MULTIPLE FONT KEYBOARD

Filed Dec. 19, 1967 3 Sheets-Sheet 2

Inventor:
THOMAS C. ABRAHAMSEN

BY H. Christoffersen
Attorney

Inventor:
THOMAS C. ABRAHAMSEN

BY H. Christoffersen
Attorney

United States Patent Office 3,517,792
Patented June 30, 1970

3,517,792

MULTIPLE FONT KEYBOARD

Thomas C. Abrahamsen, Haddonfield, N.J., assignor to RCA Corporation, a corporation of Delaware Filed Dec. 19, 1967, Ser. No. 691,816
Int. Cl. B41j 5/12
U.S. Cl. 197—98 5 Claims

ABSTRACT OF THE DISCLOSURE

A keyboard having a plurality of font sets on respective sides of multi-sided rods which are concurrently rotated to expose a selected font with the font symbols being associated with respective keyboard keys.

BACKGROUND OF THE INVENTION

Typewriter-type keyboards have been used to translate data by an operator into electrical signals, e.g., digital computer input signals. In order to provide maximum flexibility for the use of a keyboard in such applications, it is desirable to be able to utilize different sets, or fonts, of symbols at various times for translating information into electrical signals. In order to enable an operator to correctly identify the font in use, the visible symbols on the keyboard keys must be changed from one font to another. Such a change-over by prior art devices involved the physical substitution of masks or key faces which resulted in a substantial loss of time and a level of mechanical complexity which produced inherent operative problems. In order to overcome these prior art deficiencies, the present invention provides a keyboard having readily interchangeable fonts with a relatively simple electrical and mechanical structure.

BRIEF SUMMARY OF THE INVENTION

In the illustrated embodiments of the present invention, there is shown a keyboard structure having a plurality of rotatable font carriers arranged (to cooperate with a keyboard structure) to produce keys having selectively variable symbol designation. In a first embodiment, a plurality of groups of hollow hexagonal keys are supported on respective ones of a plurality of interconnected rotatable rods. The keys are flexibly connected on the rods to allow a radial motion of individual keys with respect to the rods, while a rotation of the rods rotates the keys. The faces of the keys carry the font symbols while individual switch means are positioned beneath the keys to respond to the aforesaid radial motion. In a second embodiment, the font symbols are carried on the faces of a plurality of interconnected rotatable hexagonal rods. Each rod is passed through a plurality of adjacent keys flexibly supported to allow a radial motion of individual keys with respect to the rods. A viewing window is provided on each key to expose a corresponding symbol on the respective rod while switch means are used to sense the aforesaid radial key motion. In a third embodiment, a plurality of interconected rotatable hexagonal rods carrying the font symbols on the faces thereof are each positioned adjacent to a respective set of keys. The keys are individually actuatable to operate respective switch means.

DETAILED DESCRIPTION OF THE INVENTION

Figure 1:
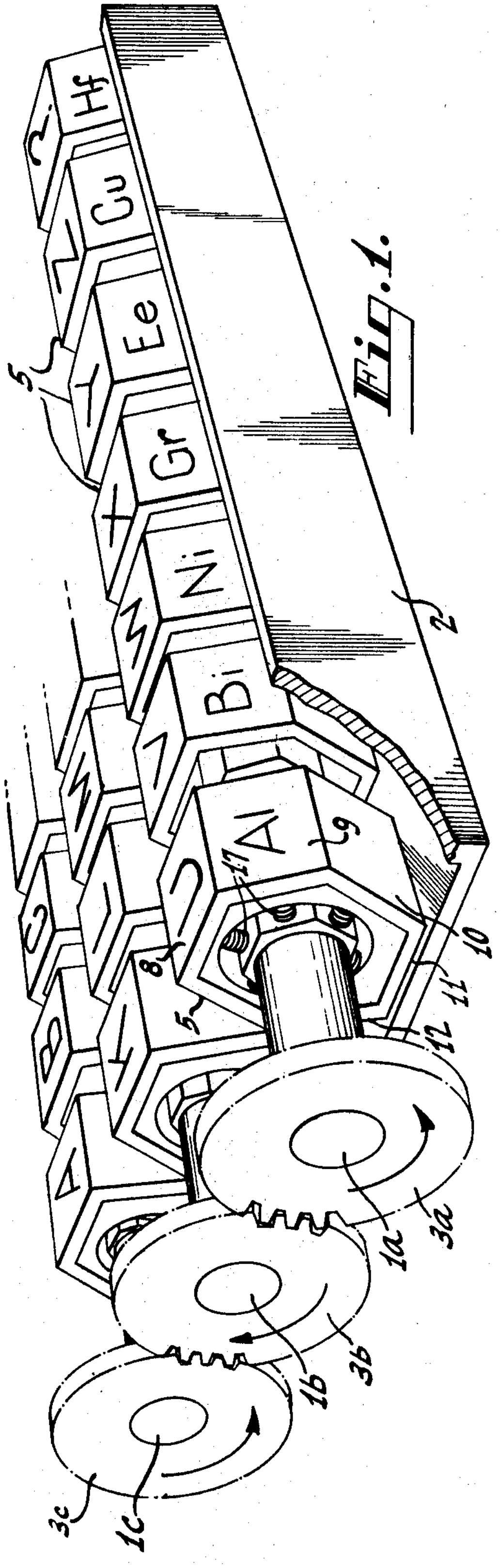
FIG. 1 is a pictorial representation of a keyboard embodying one form of the present invention.

In FIG. 1, there is shown a first embodiment of the present invention. A plurality of parallel support rods, shown as rods 1*a*, 1*b*, and 1*c*, are rotatably supported in a frame 2. The rods 1*a*, 1*b* and 1*c* may be mechanically interconnected, e.g., by gears 3*a*, 3*b* and 3*c*. These gears 3*a*, 3*b* and 3*c* are attached to the adjacent ends of respective ones of the rods 1*a*, 1*b* and 1*c*. A plurality of separate keys are supported on each one of rods 1*a*, 1*b* and 1*c* in a manner as hereinafter described. For example, a first rod 1*a* has a plurality of keys 5 arranged in a uniform spaced-apart relationship. The keys 5 are shown in this embodiment as individual hollow hexagonal elements with the six similar adjacent faces of a key 5 arranged on the periphery of that key 5. The plane of each of the key faces is parallel to the axis of the support rod 1*a*. The faces of the keys 5 are mutually aligned to form six sets of symbol supporting surfaces. Thus, a 60° rotation of the rod 1*a* by the gear 3*a* would expose a new line of symbols on the keys 5. Such a rotation of one of the supporting rods would rotate all of the rods by means of the interconnected gears 3*a*, 3*b* and 3*c* to display a complete set of new font symbols.

Figures 2A, 2B, 2C:
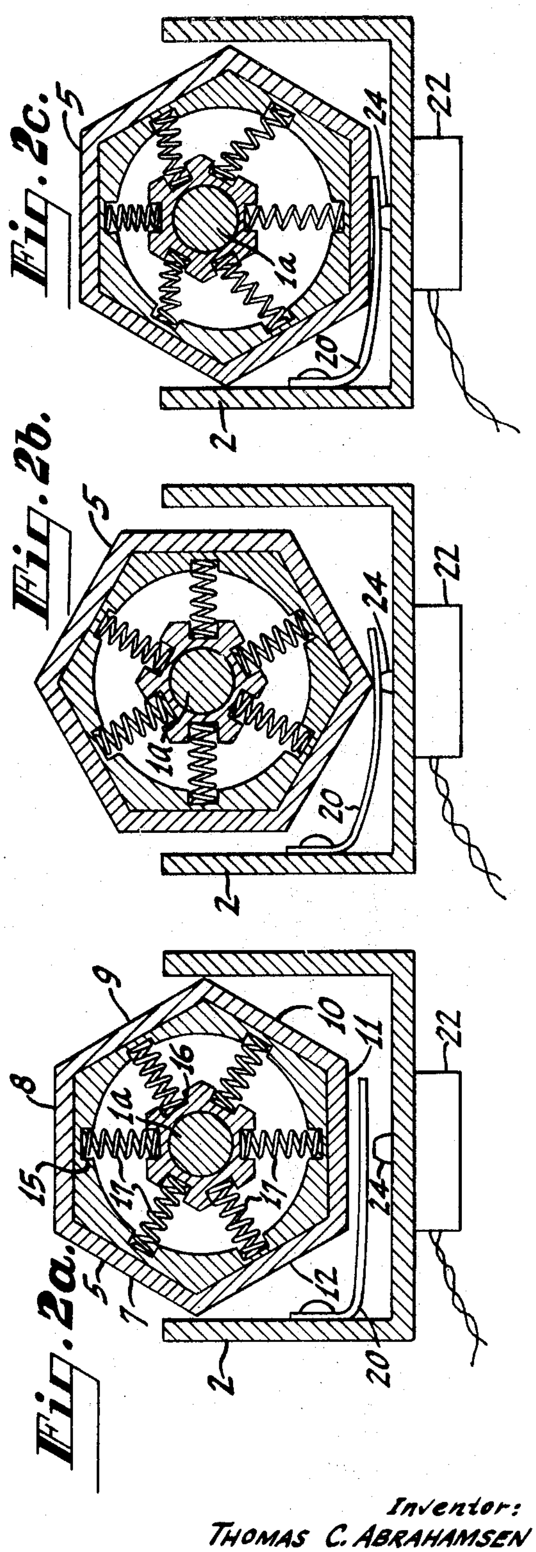
FIG. 2*a* is a partial cross-section of a portion of the keyboard shown in FIG. 1 with a key shown in a normal position.
FIG. 2*b* is a cross-section similar to FIG. 2*a* and showing a key during a font change operation.
FIG. 2*c* is a further cross-section similar to FIG. 2*a* and showing a key in an actuated position.

In FIG. 2*a*, there is shown a representative cross-section of one of the keys shown in FIG. 1. The illustration in FIG. 2*a* shows the key in an unactuated position. As previously discussed, the key 5 has six faces 7, 8, 9, 10, 11 and 12. Each of the sides of the key 5 has an interior recess, e.g., recess 15. Similarly, each of the support rods, e.g., the support rod 1*a*, has a recess aligned with a corresponding key recess for each of the key recesses 15, e.g., rod recess 16. Thus, at each key position, the rod 1*a* has six recesses corresponding to the recesses in the key 5 to form six pairs of aligned recesses. A spring is positioned between each face recess and the corresponding rod recess, e.g., spring 17. Thus, the key 5 is supported on the springs which uniformly space the key 5 from the rod 1*a* and allow a radial, i.e., downward, motion of the key 5 with respect to the rod 1*a*. Beneath the key 5 is a follower leaf spring 20 attached at one end to the key support 2. A key movement responsive means, e.g., switch mechanism 22, is positioned beneath the spring 20 with a switch actuating plunger 24 extending toward the spring 20. The spring 20 is spaced from the bottom face of the key 5 and the top of the plunger 24 in an unactuated position of the key 5.

In FIG. 2*b*, the key 5 shown in FIG. 2*a* is illustrated at the midpoint of a 60° rotation of the support rod 1*a*. During such a rotation, a corner of the key 5 depresses the plunger 24 by means of the spring 20 which is pushed toward the switch 22. The spring 20 serves to provide a smooth rubbing surface for the aforesaid corner of the key 5. Thus, the rotation of the key 5 during a font change can be effected without damage to the switch plunger 24.

In FIG. 2*c*, the key structure shown in FIG. 2*a* is illustrated in a depressed, or actuated, state. A downward motion of the key 5, e.g., by an operator, presses the spring 20 against the plunger 24 to operate the switch 22. As previously mentioned, the springs between the rod 1 and the key 5 are operative to permit a radial displacement of the key 5 with respect to the rod 1*a*. Thus, the upper springs are compressed and distorted while the lower springs are stretched and distorted when an actuating force is applied to the top surface of the key 5. This abnormal state of the springs provides a restoring force to the key 5 to return the key 5 to the unactuated position when the key actuating force is removed. A stop (not shown) may be provided to limit the downward motion of the key 5, or an inherent characteristic of the switch 22 may be so utilized.

Figure 3:
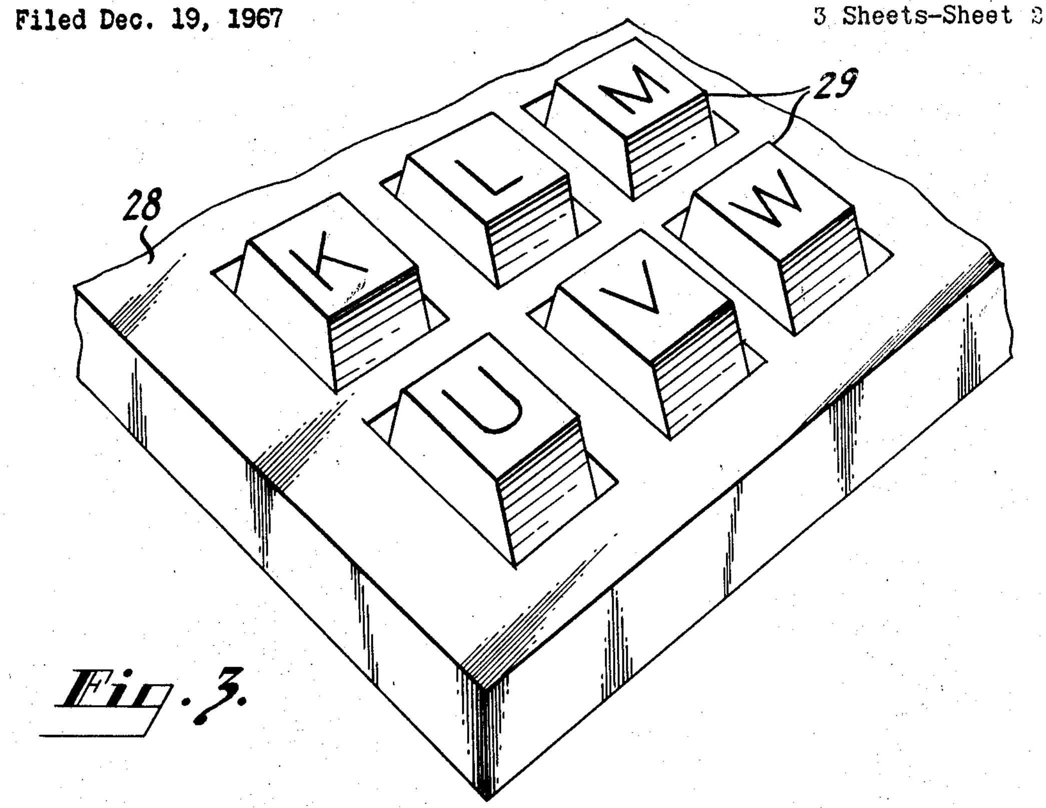
FIG. 3 is a pictorial representation of a cover for the keyboard shown in FIG. 1.

The support 2 is formed into a U-shaped longitudinal channel partially encompassing the height of the key 5, whereby the legs of the channel restrict the motion of the key 5 to an up and down movement in response to an actuating force. A cover 29 may be provided, as shown in FIG. 3 to limit the sideways motion of the keys and to allow only the font in use to be visible to the operator. The key openings 29 in the cover 28 are arranged to allow the aforesaid rotation of the keys and the support rods. Since the keys 5 are individually supported on the rods 1*a*, 1*b* and 1*c*, they may be separately actuated to affect their corresponding switches, while the concurrent rotation of the support rods 1*a*, 1*b* and 1*c* would change the font. The switch actuation during a font change in the illustrated embodiment may either be ignored by the associated equipment or may be used to represent the occurrence of a font change to adapt the associated equipment to the new font.

Figure 4:
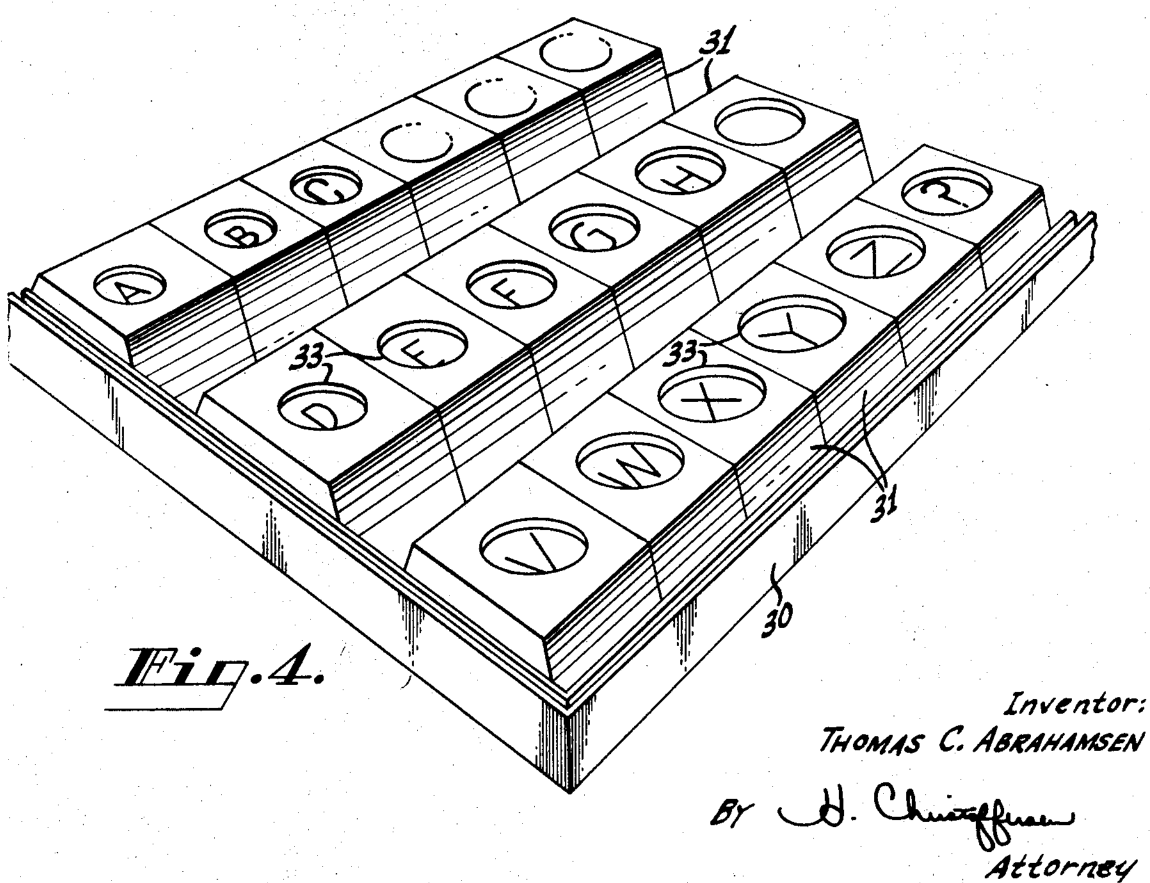
FIG. 4 is an illustration of another keyboard embodiment of the present invention.
Figure 5:
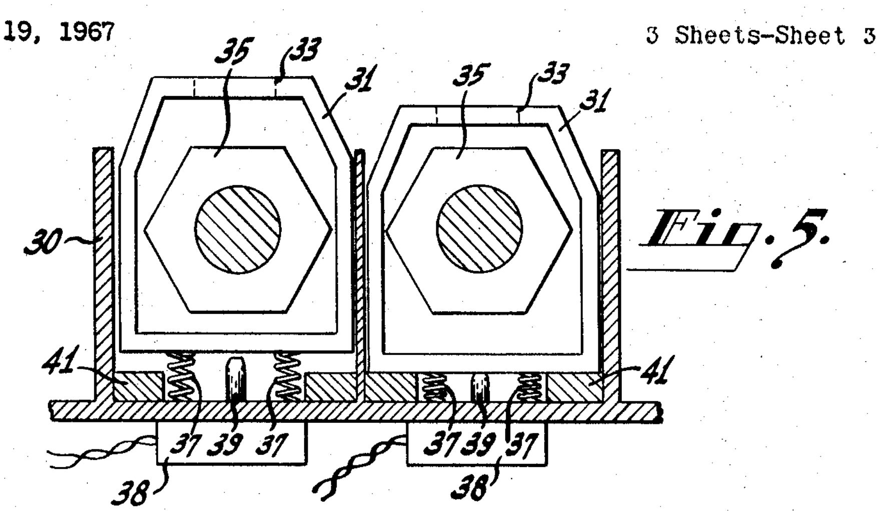
FIG. 5 is a partial cross-section of the keyboard structure shown in FIG. 4 and actuated and unactuated keys.

In FIGS. 4 and 5, there is illustrated another embodiment of the present invention. In FIG. 4, there is shown a keyboard utilizing the structure of this embodiment. A support structure 30 is used to partially enclose and restrain the plurality of groups of keys 31, which are arranged in parallel rows. Each of the keys 31 has a viewing window 33 which permits an operator to see the font symbols in use. As shown in FIG. 5, the keys 31 are generally rectangular hollow boxes having a trapezoidal top. The lefthand key is shown in an unactuated position while the righthand key is shown in an actuated, or depressed, position.

The keys 31 are arranged in rows in a side-by-side relationship with each row being located in a corresponding U-shaped channel in the supporting structure 30. Each of the keys 31 is individually supported on springs 37 located between the bottom of the keys 31 and the support structure 30. These springs 37 allow the keys 31 to be individually depressed by an operator and provide a restoring force to an unactuated position. A hexagonal rod 35 is positioned within each row of hollow keys 31. The rods 35 are rotatably mounted in the support structure 30 and may be interconnected by gears for concurrent rotation, as shown in FIG. 1. The font symbols are carried on the faces of the rods 35 and aligned with the viewing windows 33.

A separate responsive means, e.g., electrical switch 38 having an upwardly extending plunger 39, is positioned beneath each of the keys 31. A stop means 41 is also located beneath the keys 31 to limit the downward motion of the keys 31 to a distance sufficient to actuate the switches 38. Thus, each of the keys 31 can be individually depressed, by an operator, within the limits of the U-shaped channels of the support structure 30 to actuate respective ones of the switches 38. The springs 37 provide a restoring force to keys 31 to reposition them in an unactuated position after the removal of a key actuating force by the operator. The rods 35 are selectively rotatable to expose a new font through the windows 33.

Figure 6:
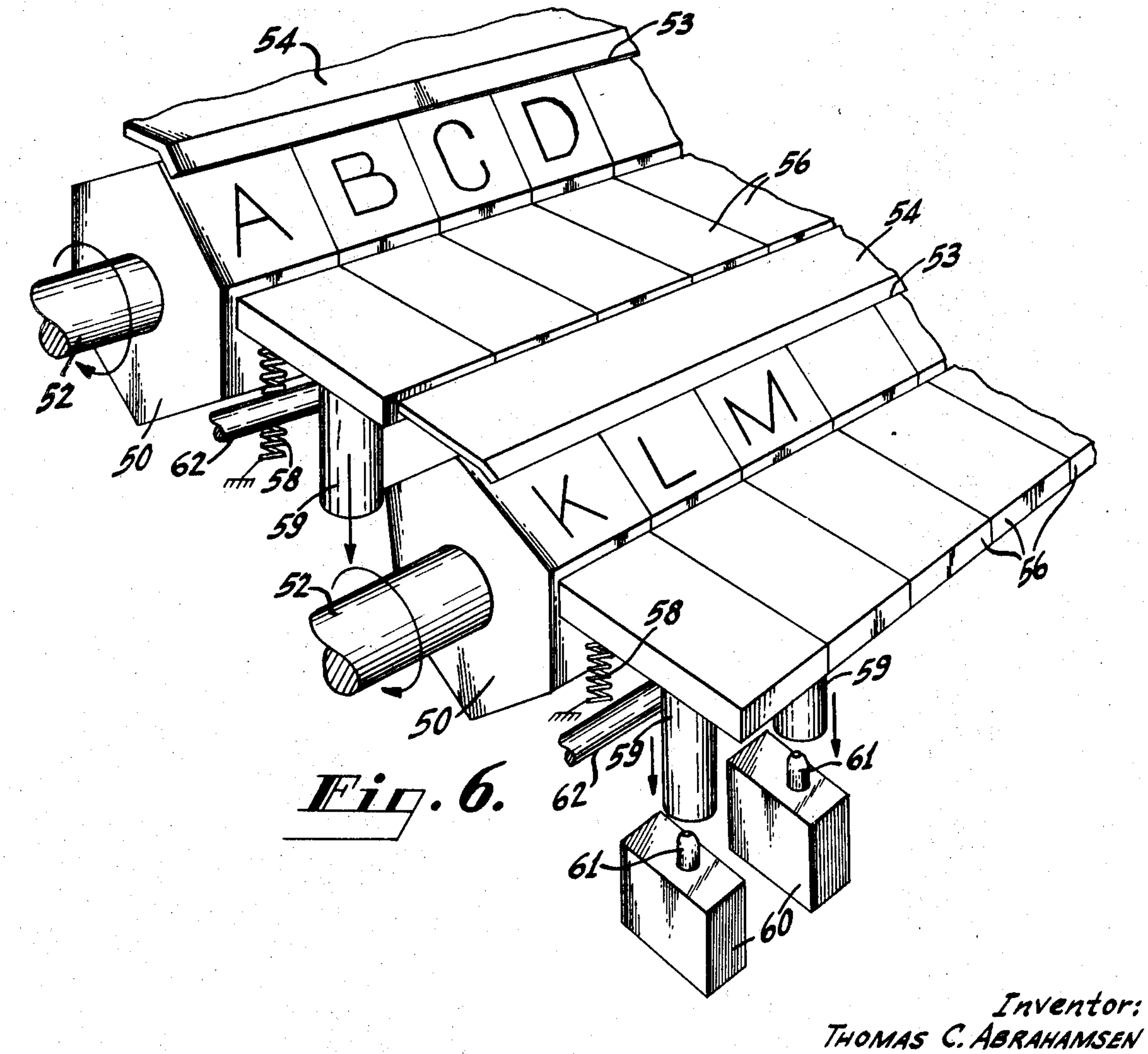
FIG. 6 is an illustration of still another embodiment of the present invention.

In FIG. 6, there is illustrated a third embodiment of the present invention. A plurality of parallel hexagonal rods 50 are rotatably mounted by means of shafts 52 and may be interconnected for concurrent rotation. The faces of the rods 50 carry the font symbols with a font of related symbols appearing on respective faces of the combined rods 50. The selected faces of each of the rods 50 are exposed through corresponding ones of a plurality of viewing slits or windows 53 extending parallel to the axis of the rods 50 in a keyboard support structure 54. A respective group of keys 56 is positioned adjacent to each of the viewing windows 53. The keys 56 are individually supported on springs, such as springs 58. As shown in FIG. 6, the keys 56 may be flat plates having downwardly extending posts 59.

An individual key movement responsive means, e.g., electrical switch 60, is positioned beneath each of the posts 59. A separate switch plunger 61 for each of the switches 60 is arranged to be actuated by the corresponding one of the posts 59 when a respective one of the keys 56 is depressed. A stop means 62 is located beneath each row of the keys 56 to limit the downward motion thereof. Thus, the keys 56 may be individually depressed to actuate a corresponding one of the switches 60 while a restoring force is provided by the springs 58. A font change is achieved by concurrently rotating the rods 50 to present a new set of symbols to the slits 53.

While the embodiments of the present invention have been presented in simplified form, it is understood that additional circuitry may be used to signal the rotation of the symbol carrying members to indicate a font change and the simultaneous actuation of more than one key without departing from the scope of the present invention. Further, additional mechanical means may be provided to restrict the keyboard to an actuation of only one key at a time. The present invention may also be used as a keyboard for typewriters producing a printed copy by providing for a change of type faces by an operator to correspond to the aforesaid font change on the keys.

What is claimed is:

1. A keyboard comprising a set of selectively actuable keys, said keys being arranged in a plurality of rows and a plurality of rod members equal in number to the number of key rows, each of said rod members carrying a respective portion of the symbols forming a font set on a rod face along a longitudinal rod axis and being associated with a respective row of said keys to relate a font symbol with a corresponding one of said keys, wherein said keys are each hollow boxes encircling respective ones of said rods while providing a passage for a rod through a pair of opposite box faces and having a viewing window in another box face to allow a view of an associated font symbol through said window.

2. A keyboard as set forth in claim 1, wherein each of said rod members is a multi-faceted rod carrying a portion of a respective font set along said longitudinal rod axis on each rod face with a font set being formed by a group of respective rod faces.

3. A keyboard as set forth in claim 2 wherein said rod members are arranged to be concurrently driven to expose successive font sets through said viewing windows in said keys.

4. A keyboard as set forth in claim 1, wherein said keys are each supported on a return spring means arranged to allow a radial motion of each key with respect to an interior rod.

5. A keyboard as set forth in claim 4, and including a key movement responsive means associated with respective ones of said keys.

References Cited

UNITED STATES PATENTS

| | | | |
|---|---|---|---|
| 442,674 | 12/1890 | Wier | 197—98 XR |
| 701,563 | 6/1902 | Hammond | 197—104 |
| 1,086,823 | 2/1914 | Hebern et al. | 197—98 XR |
| 1,653,683 | 12/1927 | Whitaker | 197—98 XR |
| 2,085,166 | 6/1937 | Nolte | 197—104 |
| 3,080,115 | 3/1963 | Buchholz | 235—145 |
| 3,169,474 | 2/1965 | Howard | 101—110 |

EDGAR S. BURR, Primary Examiner

U.S. Cl. X.R.

197—4, 104; 235—145